April 27, 1965        H. E. DARLING        3,180,974
HIGH POWER PROCESS CONTROL APPARATUS
Filed Feb. 21, 1962        5 Sheets-Sheet 4
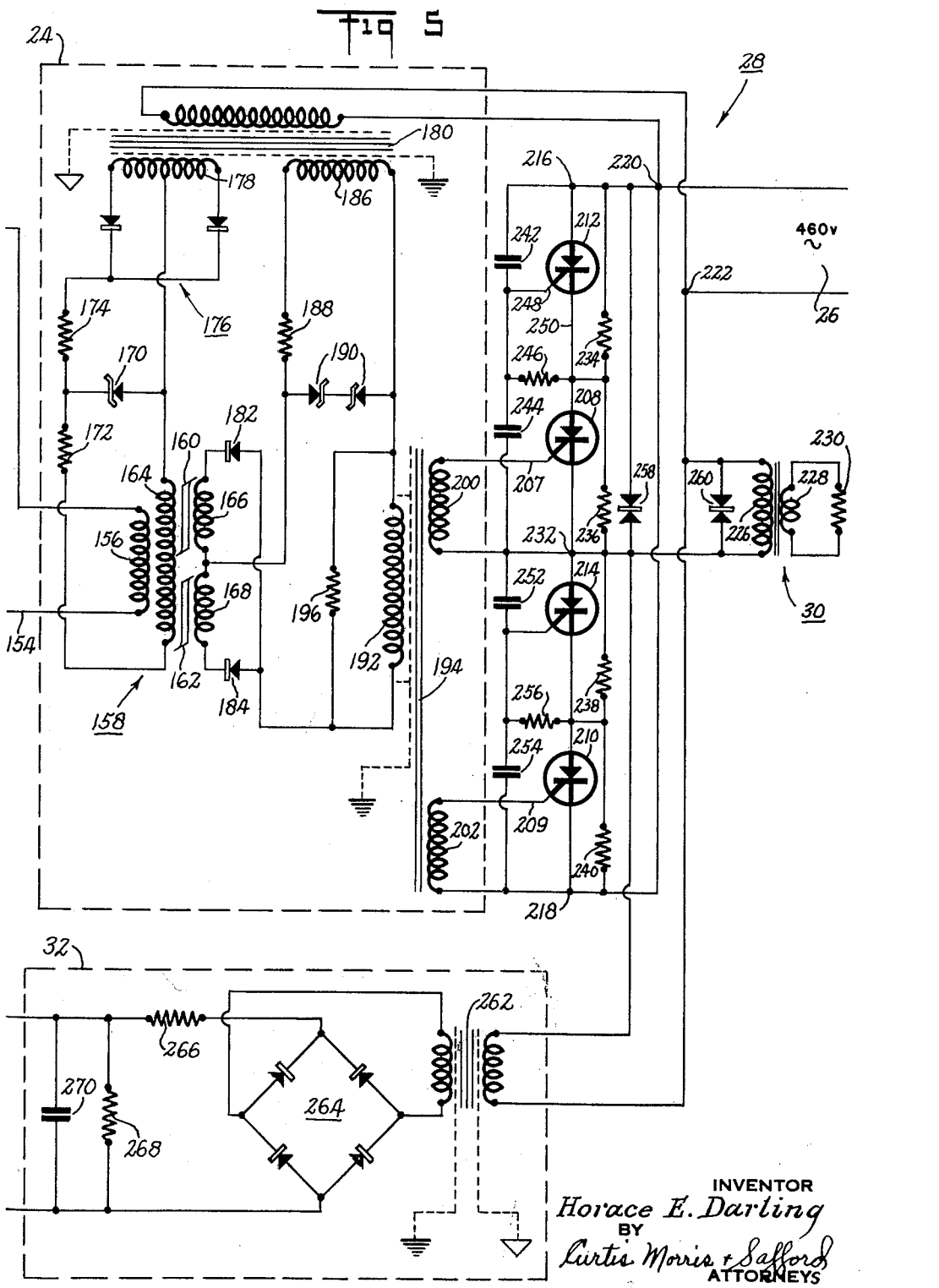
INVENTOR
Horace E. Darling
BY
Curtis Morris + Safford
ATTORNEYS April 27, 1965   H. E. DARLING   3,180,974
HIGH POWER PROCESS CONTROL APPARATUS
Filed Feb. 21, 1962   5 Sheets-Sheet 5
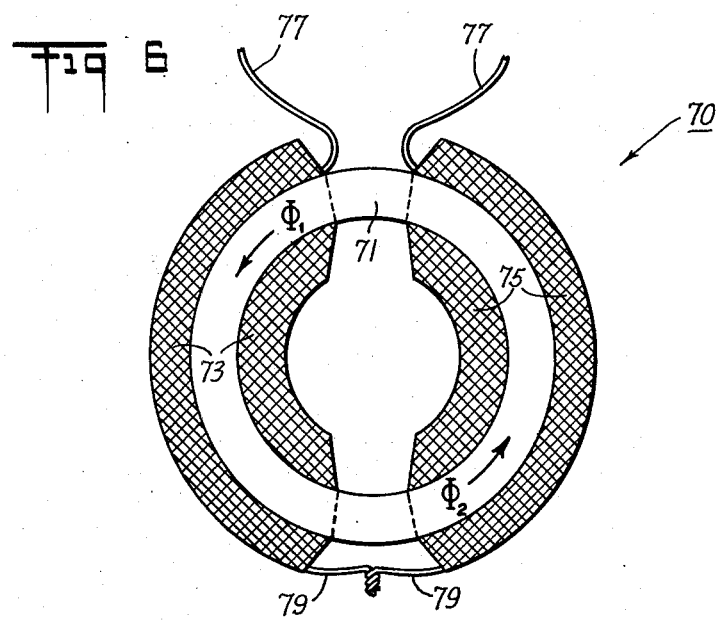
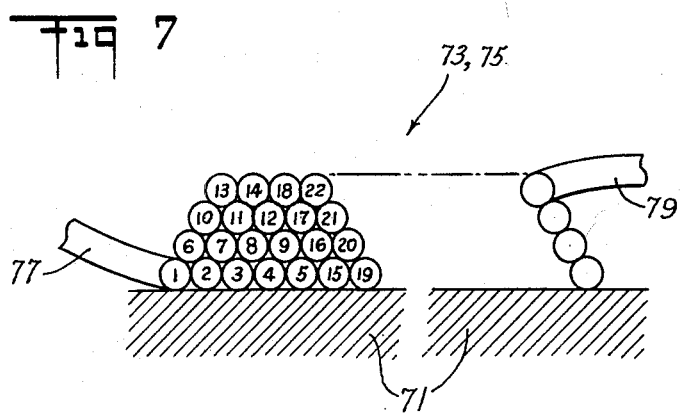
INVENTOR
Horace E. Darling
BY
Curtis Morris + Safford
ATTORNEYS › # United States Patent Office 3,180,974
Patented Apr. 27, 1965

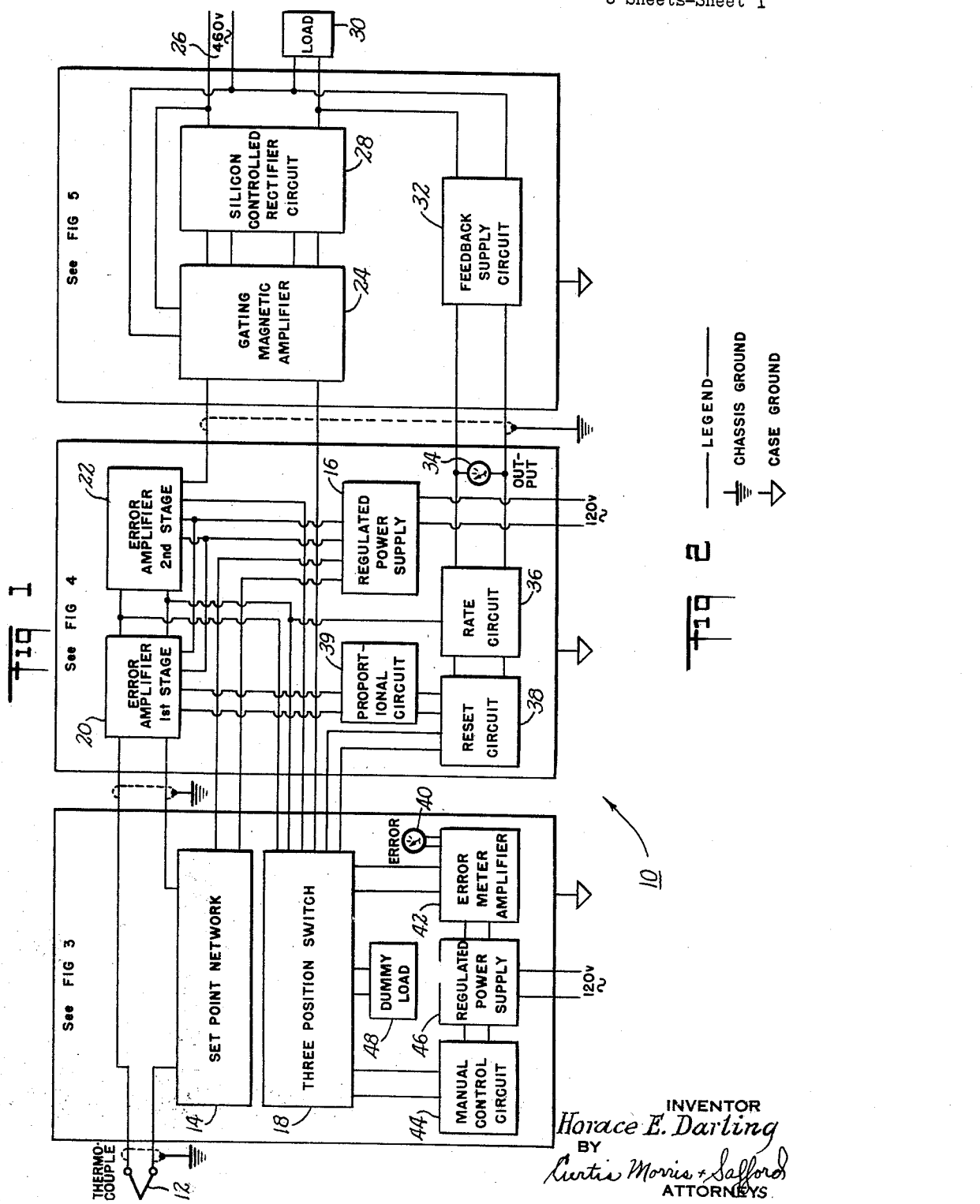

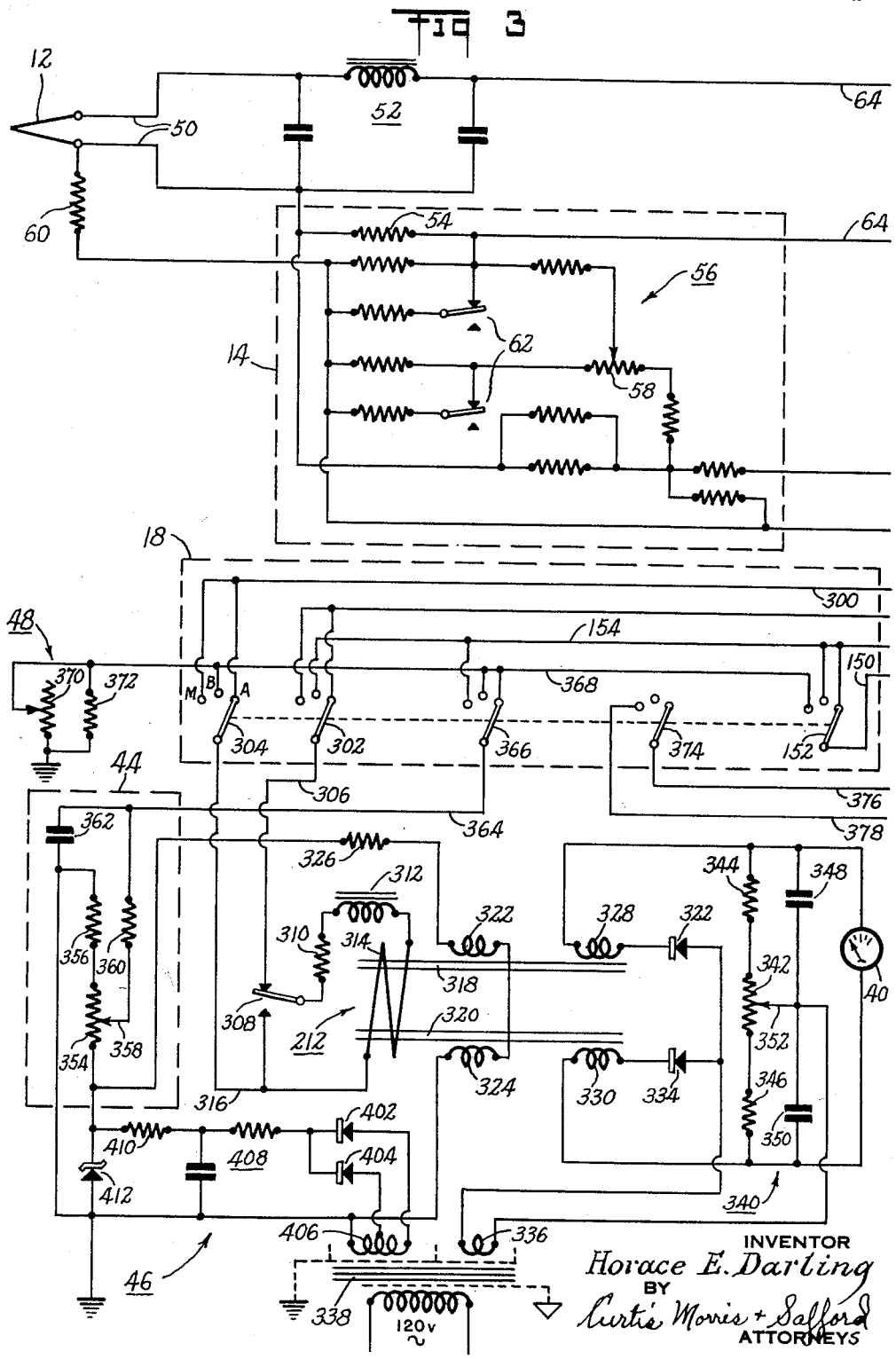

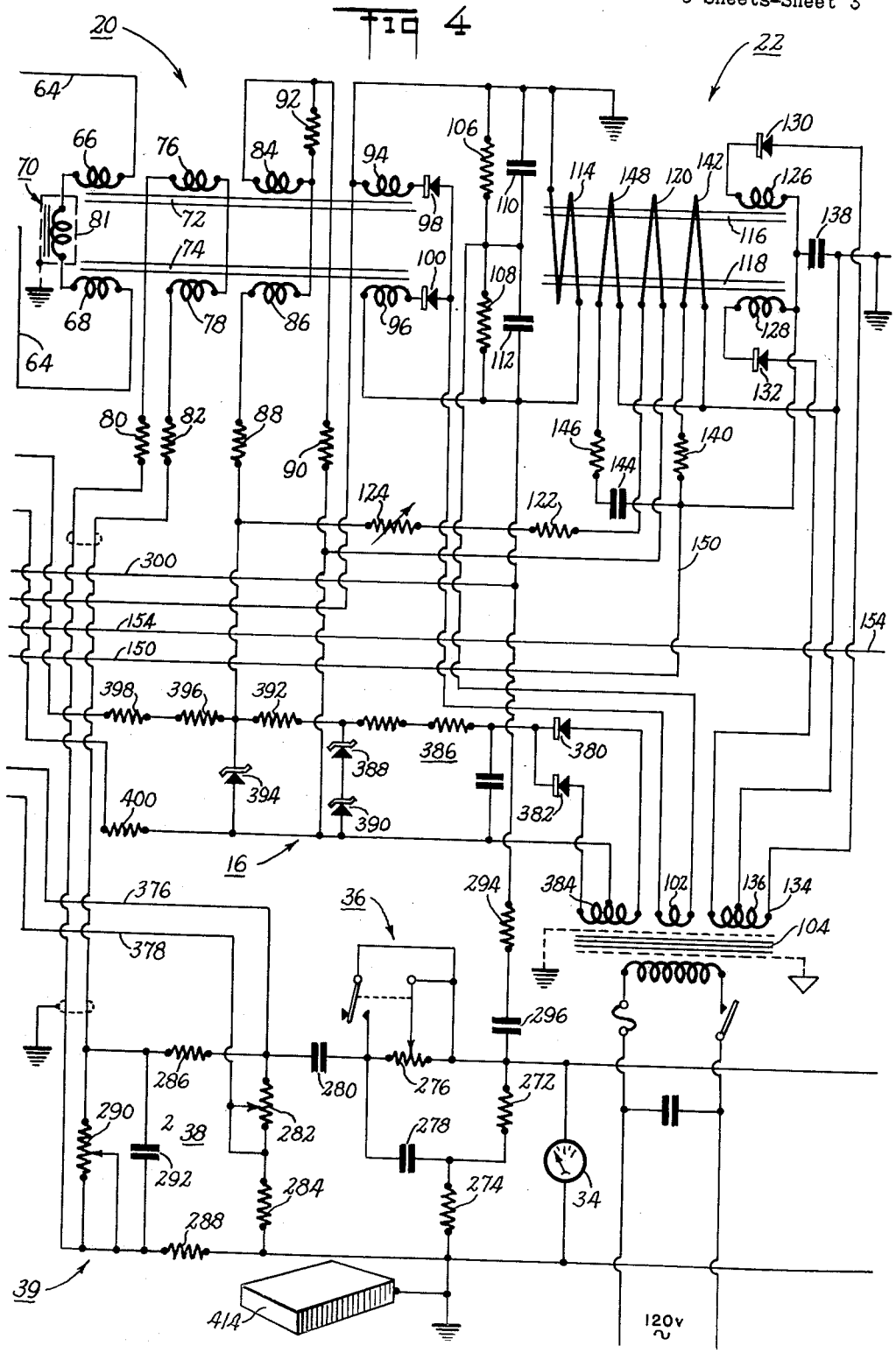

3,180,974
HIGH POWER PROCESS CONTROL APPARATUS
Horace E. Darling, North Attleboro, Mass., assignor to
The Foxboro Company, Foxboro, Mass.
Filed Feb. 21, 1962, Ser. No. 174,891
22 Claims. (Cl. 219—497)

This invention relates to apparatus for controlling large amounts of electrical power. More specifically, this invention relates to industrial process-control apparatus for regulating the flow of electrical energy to a load for maintaining a parameter of the process at a desired value. In an embodiment of this invention described herein below, there is provided electrical apparatus for controlling the flow of large amounts of electrical power to a load so as to maintain an industrial process temperature at a desired value.

Various types of electric power controllers have been used in the past. Those using vacuum tubes have the disadvantage that vacuum tubes are sensitive to the physical shock they receive in many industrial locations and tend to fail unless special protection is provided. The use of vacuum tubes has a further disadvantage when relatively large amounts of electrical power must be controlled in that the tubes dissipate large amounts of heat, often necessitating extra cooling apparatus and substantial expenditures for the wasted energy. In addition, high-powered vacuum tubes are large and fragile, so that the controller, its protective shields and cooling apparatus occupy substantial amounts of factory space.

Controllers based on the use of magnetic amplifiers also have been used extensively, and have proved rugged and reliable in many instances. However, controllers based solely on the use of magnetic amplifiers are not widely used for industrial control because of their slow response time, large size, expensive construction, and power loss.

Accordingly, one of the most important objects of this invention is to provide an improved electric power controller.

Another object of this invention is to provide an industrial process controller that is capable of accurately controlling the flow of large amounts of electrical energy, and yet is relatively inexpensive to manufacture and small in size.

Another object of this invention is to provide such a controller which is rugged and reliable.

A further object of this invention is to provide such a controller which has a relatively high speed of response to process parameter changes.

A still further object is to provide such a controller which operates very efficiently and has a low level of heat dissipation.

A more specific object of this invention is to provide such a controller which can maintain a temperature at a desired value with a high degree of accuracy.

Other objects, aspects and advantages of the present invention will be pointed out in, or apparent from, the following description and drawings, of which:

FIGURE 1 is a block diagram of a controller constructed in accordance with this invention;

FIGURE 2 is an explanatory diagram of certain symbols used in the drawings;

FIGURES 3, 4 and 5 are detailed schematic diagrams of the controller shown in FIGURE 1;

FIGURE 6 is a plan and sectional view of a choke used in the controller of FIGURE 1; and FIGURE 7 is a schematic winding diagram of the choke shown in FIGURE 6.

Referring now to FIGURE 1, the process controller 10 uses a thermocouple 12 to sense the temperature of an object or material, the temperature of which is to be controlled. The voltage output of the thermocouple 12 is connected in series with an opposing regulated voltage developed by a set point network 14 and a precision regulated power supply 16. The set point voltage is manually adjusted to a millivoltage corresponding to the millivoltage that would be produced by the thermocouple at the desired operating temperature. When the measured temperature is different from its desired value, an error voltage is created which is equal to the difference between the fixed set point and thermocouple voltages and has a polarity depending upon whether the measured temperature is greater or less than the desired temperature.

The controller 10 is provided with means for both manual and automatic operation. Selection of the desired mode of operation is made by setting the three-position switch 18 at the appropriate position. When automatic operation is selected, the error voltage is amplified by cascading a specially designed very low input level balanced amplifier stage 20, a conventional self-saturating stage 22, and an SCR (silicon controlled rectifier) gating magnetic amplifier 24 which controls the conduction of electrical power from a power source 26 through a silicon-controlled-rectifier circuit 28 to a load 30. The load 30 includes a heating element to heat the object or material whose temperature is to be controlled.

The input to the SCR gating magnetic amplifier is set so that when the measured temperature is at the desired value, and the error signal is within prescribed limits (0–8 micro-volts for full throttle of output power), the silicon controlled rectifier circuit 28 permits just enough power to flow to the load to maintain the temperature at the desired value. When the minute error signal is changed as a result of change in the measured temperature, it causes a change in the power conducted through the circuit 28 so that more or less heat can be supplied to return the measured temperature to the desired value.

The controller also includes means for developing "proportional," "rate" and "reset" action in the output signal, to assure stable operation at narrow proportioning band settings, and to avoid "droop" of the controlled process condition. For this purpose, the A.C. voltage across the load 30 is coupled to a feedback supply circuit 32 which produces a corresponding D.C. feedback signal to be conducted successively to a rate circuit 36, reset circuit 38, and proportional circuit 39. The latter circuits, in turn, transmit an appropriately modified feedback signal to the first stage error amplifier 20 to develop the required "proportional," "rate," and "reset" functions.

It is desirable to provide for visual indication of the magnitude and polarity of the error voltage existing at any time, and for this purpose a meter 40 is connected through a meter amplifier 42 and switch 18 to the output of the first stage error amplifier 20. Since it sometimes is necessary to operate the controller manually, there is provided a manual control circuit 44 which is supplied by a regulated power supply 46 and furnishes a manually-adjustable regulated voltage for controlling the power flow to the load 30.

When the switch 18 is set for automatic operation of the controller 10, the manual control voltage is fed to a dummy load 48 which is set to approximate the input resistance of the gating magnetic amplifier 24. When the switch 18 is set for manual operation, the output of the error amplifiers 20 and 22 is switched from the input of the gating magnetic amplifier 24 to the dummy load 48 and the manual control voltage is applied to the gating magnetic amplifier 24.

An intermediate position of the switch 18 is provided for transferring from the automatic to manual modes of operation with a minimum of disturbance to the system. When the switch 18 is in this position the error meter is connected to the output of the error amplifier second stage 22 and the manual control output so they can be made equal before switching to the manual position, thereby preventing large switching transients in the circuit.

The embodiment of FIGURE 1 will now be described in greater detail by reference to FIGURES 3, 4 and 5 of the drawings.

In the upper left-hand corner of FIGURE 3 the thermocouple 12 is shown connected by a pair of leads 50 to a conventional LC filter 52. The output of the filter 52 is connected in series opposition to the D.-C. output voltage of the set-point network 14 which is developed across a resistor 54 by a current-dividing network generally indicated at 56. This network 56 is supplied by the precision regulated power supply 16 (see FIGURE 4), and includes a set point adjustment potentiometer 58 which controls the voltage across resistor 54. A temperature-sensitive resistor 60 also is provided to compensate, in the usual way, for changes in the "cold junction temperature." A two-position switch 62 permits changing the range of the control system, e.g. between a measured temperature range of 500–1500° F. and a range of 1500–2500° F.

As was explained above, when the output voltage of the filter 52 is different from the voltage on resistor 54 there will be developed across leads 64 an error signal having a magnitude proportional to the deviation of the temperature from the desired set point, and having a polarity determined by whether the temperature is above or below the set point.

The amplifier 20 is comprised of a pair of closely matched cores 72 and 74, for example in the form of a toriod as disclosed in my United States Patent No. 3,016,493, issued January 9, 1962. Identical control windings 66 and 68 are wound on cores 72 and 74, respectively, and are connected to leads 64 to receive the error signal. Windings 66 and 68 are connected together in series through a specially designed high impedance isolation choke 70, which is utilized to minimize the alternating current flow induced in windings 66 and 68 by the A.-C. supplied output windings of the amplifier 20. The choke 70 is specially wound so that the net distributed capacitance between its terminals is kept to a very low value. This latter property reduces to a minimum unwanted distributed capacitive coupling between control windings 66 and 68, thereby greatly reducing spurious effects due to capacitive pick-up, and provides good common-mode rejection of A.-C. signals relative to ground. This common-mode rejection is in effect obtained by keeping all four terminals of windings 66 and 68 at nearly the same A.-C. potential relative to ground. A.-C. voltages induced in series with the thermocouple leads are also undesirable, and are reduced to an acceptable minimum by the filter 52.

Referring now to FIGURES 6 and 7, the choke 70 includes a winding form 71 on which is wound a pair of symmetrically-arranged "bank" type windings 73 and 75. Each winding, 73 and 75, is wound in the manner and sequence indicated in the schematic wiring diagram of FIGURE 7 so that the initial end 77 and the terminal end 79 of each winding are physically spaced as far from each other as is possible, with the result that the distributed capacitance of the choke is minimized. The interconnected ends 79 of the windings 73 and 75 are located physically near to one another to minimize stray pick-up in the interconnections, and the windings are wound in opposite directions so that their inductances will add when the windings are so arranged.

The windings are symmetrically arranged with respect to one another and the whole choke 70 is enclosed in a shield 81 (see FIGURE 4) which is connected to "chassis ground" (as will be described hereinafter) so that the capacitance between each terminal 77 of the choke and chassis ground is substantially the same. This feature promotes common-mode rejection of A.-C. signals as explained above.

A pair of identical series-connected feedback windings 76 and 78 are provided for these cores 72 and 74, and are energized through corresponding resistors 80 and 82, of relatively high ohmic resistance, by the proportional circuit 39, the feedback rate circuit 36 and the reset circuit 38. The resistors 80 and 82 serve, by virtue of their high resistance, low distributed capacity, and symmetrical positioning, in a manner analogous to inductor 70, to improve the stability of the amplifier and to reduce the effects of capacitive pick-up.

Identical bias windings 84 and 86 also are wound on the magnetic cores 72 and 74 respectively and are energized in series by the regulated power supply 16. Two current limiting resistors 88 and 90 are connected in this energizing circuit, and a resistor 92 is connected across one of the windings 84 to adjust the net core flux of all windings on either core 72 or 74 to equal the net flux of the other core, thereby producing zero net output for the condition of zero current into windings 66, 68, 76 and 78. The resistor 92 is therefore a vernier trim adjustment of zero output for zero input, and helps control the zero stability of the amplifier 20.

The output windings 94 and 96 of the amplifier 20 are energized in parallel through a corresponding pair of diodes 98 and 100, the common terminals of which are connected to a six-volt winding 102 of a power transformer 104. The remote terminals of output windings 94 and 96 are connected to opposite ends of a balanced load consisting of a pair of matched series resistors 106 and 108, each having a corresponding filter capacitor 110 and 112. The common point of this balanced load is returned to the secondary winding 102, and the output voltage of the amplifier 20 is taken from the remote ends of this balanced load.

The amplifier 20 is so arranged that when there is no current flowing through the input windings 66, 68 and feedback windings 76, 78, the cores 72 and 74 will be magnetized to an equal extent, and therefore the pulses of current flowing through the output windings 94 and 96 to the load resistors 106 and 108 also will be equal. Since these resistors are of equal ohmic resistance and are connected in series opposition, the net output voltage of the amplifier appearing across the remote ends of the balanced load will be zero when there is no input current.

However, when current flows through input windings 66, 68 or feedback windings 76, 78, the magnetization of one of the cores 72 and 74 will be increased while the magnetization of the other will be decreased a corresponding amount. Accordingly, the output currents flowing through the windings 94 and 96 no longer will be equal, and therefore a net output voltage will be developed between the remote ends of the output resistors 106 and 108. The magnitude of this net voltage will be proportional to the magnitude of the input current through windings 66, 68 or windings 76, 78, and its polarity will be determined by the direction of flow of the input current.

The above form of amplifier 20 has been found to be particularly advantageous as the first stage of amplification for such a control system, in part because the amplifier is relatively insensitive to changes in the supply voltage and thus can be used to detect extremely small changes in output voltage produced by the thermocouple 12. The insensitivity to supply voltage changes results from the fact that both of the output windings 94 and 96 are energized simultaneously, i.e. on the same half-cycle of the power line voltage, and that the output voltages developed by these two windings are connected in series-opposition across the resistors 106 and 108. Thus, if there is a change in the power line voltage, this change will produce equal, but opposite, changes in voltage across the resistors 106 and 108, so that the net output voltage of the amplifier will be unaffected. Moreover, the stability of this amplifier is especially enhanced by the use of separate windings for each of the cores 72 and 74, and by providing isolating circuit elements 70, 80 and 82 which afford a relatively high impedance to the flow of alternating current in the input and feedback windings. The balanced, symmetrical construction of the amplifier 20 also makes the unit very insensitive to ambient temperature changes, with the result that it will have a stable zero with respect to time, temperature, and line voltage. This stability is extremely difficult to achieve by the use of conventional amplifiers.

The first stage output voltage developed across the resistors 106 and 108 is directed to an input winding 114 of the second stage magnetic amplifier 22. This amplifier stage also includes a pair of magnetic cores 116 and 118 which, as before, may be toroidal in configuration. These cores are provided with a single bias winding 120 which is energized by the regulated power supply 16 through a circuit including a fixed resistor 122 and a variable resistor 124, the latter serving as the zero setting adjustment of the controller 10; that is, as an adjustment of the steady output of the amplifier 22 when there is no error signal.

A pair of output windings 126 and 128 are energized on alternate half-cycles of the A.-C. power line voltage through rectifiers 130 and 132 which are connected respectively to opposite ends of a six-volt secondary 134 of the power transformer 104. The center tap 136 of this winding is coupled through a filter capacitor 138 to the common junction between the output windings so that the output voltage of the second stage amplifier 22 appears across this filter capacitor. This output voltage is conductively coupled through a resistor 140 to a first positive feedback winding 142, wound around both cores 116 and 118, and provides a source of gain adjustment for the amplifier 22, and is capacitively coupled through a capacitor 144 and a resistor 146 to a second positive feedback winding 148. This feedback arrangement serves to damp spurious instabilities in the amplifier stage 22, and allows for adjustment of the frequency response of the overall system to the desired characteristic.

The output signal developed by the windings 126 and 128 is directed through a lead 150 to one contact arm 152 of the three-way switch 18 (see FIGURE 3). When the switch 18 is in automatic position (shown in the drawing), the output signal of amplifier 22 is connected through a lead 154 to the input winding 156 of a magnetic amplifier 158 which forms the input portion of the SCR gating magnetic amplifier 24. The amplifier 158 includes a pair of magnetic cores 160 and 162 having a bias winding 164 and a pair of output windings 166 and 168. The bias winding 164 is provided with direct current from a regulated power supply including a Zener diode 170, a pair of series resistors 172 and 174, and a full-wave rectifier circuit 176 energized by a winding 178 of a power transformer 180 which is energized by the 460 volt, 60-cycle power source 26.

The output windings 166 and 168 are energized through respective rectifiers 182 and 184 by an A.-C. energizing circuit which includes a 110-volt secondary winding 186 of transformer 180 which has a series resistor 188 and a voltage limiter or "clipper" consisting of a pair of reverse-connected Zener diodes 190. These diodes are typically arranged to break down at a potential of 25 volts, thereby producing an essentially square-wave signal having a peak-to-peak amplitude of 50 volts. One side of the clipper output is applied to the common junction between the windings 166 and 168, and the other side is connected through the primary winding 192 of a transformer 194 and a parallel resistor 196, to the rectifiers 182 and 184.

It will be evident that during one half-cycle of the square-wave voltage produced by the Zener diodes 190, the core 160 will become saturated and permit heavy conduction in one direction through primary winding 192 of transformer 194. At a corresponding point in the next half-cycle, the core 162 will saturated to permit heavy conduction in the other direction through the primary winding 192. During each cycle of A.-C. power supplied to the transformer 180, the instant at which such saturation occurs is controlled by the magnitude of the current flowing through input winding 156.

The transformer 194 is a high-quality transformer which accurately passes both high and low frequencies and therefore accurately passes the square waves of voltage, developed by the Zener diodes 190, through to its two secondary windings 200 and 202. The top secondary 200 is polarized oppositely with respect to the lower secondary 202 so that during one half-cycle of source voltage, the voltage on secondary 200 will be positive while that on the lower secondary 202 is negative, and vice-versa during the next half-cycle.

The positive square waves of voltage developed by the secondaries 200 and 202 are the output of the SCR gating magnetic amplifier 24 and are directed to corresponding control electrodes 207 and 209 of two "silicon controlled rectifiers" (hereinafter referred to as SCR's) 208 and 210. SCR's 208 and 210 are connected in series to two other SCR's 212 and 214. The remote ends 216 and 218 of this series arrangement are connected together and to one terminal 220 of the power source 26. The other terminal 222 of the power source 26 is connected to the load 30 which typically includes a primary winding 226 of a power transformer whose secondary winding 228 is connected to a heating element 230 which heats the object whose temperature is being controlled. The load 30 is also connected to the midpoint 232 of the four series-arranged SCR's. This arrangement provides for conduction of current through the load during each successive half-cycle of source voltage. The series connection of the SCR's is necessary because of the high voltage required to supply high power to the load and the unavailability of high-voltage rating SCR's.

During one half-cycle of the alternating source voltage, equal A.-C. voltages will be applied to SCR's 212 and 208 from the source 26, with the polarity that is necessary for them to conduct (positive polarity) while equal negative voltages will be applied to SCR's 214 and 210. Equal resistances 234, 236, 238 and 240 are connected in parallel, respectively, with SCR's 212, 208, 214 and 210 so that the voltage drop across each SCR will be the same during that period when the SCR's have not been triggered into a conducting state. During the next half-cycle equal negative voltages will be applied to SCR's 212 and 208 while equal positive voltages are applied to SCR's 214 and 210.

At some time during a half-cycle of source voltage, a positive increasing leading edge of a gated square wave voltage will be produced in either winding 200 or 202. If, for example, the voltage is first produced in winding 200, SCR 208 will become fully conducting at the instant the voltage is applied to its control electrode 207.

It is necessary for the second SCR 212 to fire as soon as possible after the first SCR 208, since delay in firing SCR 212 for more than a few micro seconds can cause its destruction. For this purpose a series combination of two equal capacitors 242 and 244 is connected in parallel with the series combination of resistors 234 and 236, and with SCR's 212 and 208. (During the non-conducting period, the SCR's 212 and 208 act as essentially open circuits, as compared with resistors 234 and 236.) A resistor 246 of relatively low ohmic value is connected between the midpoints of the capacitor and SCR series combinations, and the control electrode 248 of SCR 212 is connected to the junction of the midpoint of the capacitor combination with the bias resistor 246.

With the above arrangement, both SCR's 212 and 208 are non-conducting during the first portion of a half-cycle of source voltage, and voltage builds up equally across both capacitors 242 and 246. When a positive pulse is produced in winding 200, SCR 208 fires and in less than five microseconds becomes an almost perfect short circuit. The charge then existing on capacitor 244 flows through the low resistance path presented by resistor 246 and SCR 208 and creates a transient positive voltage pulse across resistor 246. This pulse is applied to control electrode 248, and thus SCR 212 will be transformed to a fully conducting state by the pulse a short time after SCR 208 has fired, the pulse magnitude and duration being determined by the values of resistance and capacitance used. Since there is a gated square-wave of voltage on the winding 200, SCR's 208 and 212 remain fully conducting until the end of the half-cycle, whereas they might cease conducting before that time if a voltage spike were instead produced by winding 200.

In the same manner as above, capacitors 252 and 254 and resistor 256 are used to control the firing of SCR 214 when, during the next half-cycle of source voltage, a firing signal is produced by winding 202.

The above method of series SCR control has an advantage over other methods (such as using individual secondary windings to fire each SCR) in that the time delay between firing of adjacent SCR's is closely controllable whereas the firing of the SCR's may be erratic when other methods are used.

Since it is undesirable to permit the voltage applied across the series-connected SCR's to exceed a certain maximum value, a voltage "clipper" or limiter 258 (e.g. a double diode known commercially as a "thyrector") is connected between the midpoint 232 and the remote ends of the series SCR arrangement. A similar voltage limiter 260 is connected in parallel with the load 30 to limit switching and load change transients to a safe value.

It should be noted that the SCR gating magnetic amplifier is biased in such a manner as to protect the SCR's and load circuit from starting surges and loss of control signal. Consider first the problem of start-up surge. If no reference bias were provided to magnetic amplifier 158 from the source 176, then during the first cycle after closing the power switch of circuit 26, all SCR's would be fully conducting, provided that the magnitude of the control signal of winding 156 is less than the normal control level. Such abrupt start-up, especially into a transformer load, can result in transient voltages and currents which could exceed the rating of the SCR's, and result in permanent damage. Under some conditions, the load 230 can also be damaged by such surges of current. To avoid this occurrence, a bias is applied to amplifier 158 through winding 164 energized from transformer 180 connected to the same source of power 26 that supplies the load. The direction and magnitude of this bias is such that with zero control current into winding 156, the magnetic amplifier 158 is biased well into the non-conducting state, and hence none of the SCR's receive a gating signal at any time, and as a result no load current flows. The Zener diode 170 in the bias circuit insures that the bias current will be essentially independent of line voltage variations. Upon closing of the power switch of the supply 26, voltage is now applied simultaneously to the gate circuit 186 and bias circuit 176 of magnetic amplifier 158. Since initially there is no bias current, the SCR's receive a gating signal and start to turn on, while at the same time, bias current starts to flow through winding 164 in a direction such as to turn the SCR's off. By proper choice of circuit constants, the SCR's will start to fire and will be completely turned off within three cycles of the supply frequency with the peak load current not exceeding one third possible maximum value. Thus dangerous starting-up surges are avoided, greatly increasing the life expectancy of the SCR's.

The bias circuit of magnetic amplifier 158 also protects the load against failure of the controller or connecting cable 154. The bias of circuit 176 of magnetic amplifier 158 is of such a magnitude that a definite minimum control signal (such as 3 milliamperes) must be applied to control winding 156 to over-ride the bias current flowing in winding 164 before gating action can start in magnetic amplifier 158 and turn on the SCR's. Thus, if a failure occurs in the controller amplifiers 20, 22 or attendant circuitry, and the output of amplifier 22 drops to zero or below the required operating minimum, the SCR's are automatically shut off by the bias circuit 176, and "fail safe" operation is achieved.

It should also be noted that the gate windings 166, 168 should in any event be energized from the high voltage source 26 to assure that the firing signals are synchronized with the A.-C. power applied to the SCR's. The load resistor 196 across the primary of transformer 192 is used to compensate for the small but inevitable phase shift that will occur in the magnetic amplifier-transformer circuit, and insures that the signals applied to the SCR gates are properly in phase with the power supply 26.

The overall operation of the SCR gating magnetic amplifier 24 and the silicon controlled rectifier circuit 28 is as follows:

The source voltage builds up during one half-cycle until a positive signal is produced in winding 200. SCR's 208 and 212 fire almost simultaneously and conduct power from the source 26 to the load 30 for the remainder of that half-cycle. When the source voltage approaches zero, SCR's 208 and 212 become non-conducting and no power flows through them. This sequence is repeated during the next half-cycle of source voltage with respect to SCR's 210 and 214.

The amount of power transmitted to the load 30 is determined by the percentage of time that the SCR's are conducting during each half-cycle. The firing signals produced by the transformer 194 are synchronized with respect to the source voltage by energizing the power transformer 180 from the same source as is applied to the series-connected SCR's. As a result, the amount of power transmitted to the load 30 will depend on the instant during each half-cycle at which the firing pulse is produced. This firing pulse is produced when the magnetic cores 160 and 162 saturate, and the time of saturation, within the A.-C. cycle, is determined by the magnitude of D.-C. control current flowing through the input winding 156 of the SCR gating magnetic amplifier 24.

As explained above, the control current flowing through input winding 156 is a function of the difference voltage between the output of the thermocouple 12 and the set point voltage appearing across resistor 54. When the measured temperature is stabilized at the control point, the thermocouple voltage will be nearly equal to the set point voltage, the output of the first stage amplifier 20 will be nearly zero, and the current through the input winding 156 will be such as to allow a sufficient flow of power to the heating element 230 to maintain the temperature of the heated object constant. When the measured temperature increases, the current through winding 156 will change to alter the firing point of the SCR's so as to reduce the power delivered to the element 230, thereby tending to return the measured temperature to the set point. If the temperature drops below the set point, the power delivered to the element will correspondingly increase and tend to maintain the temperature constant.

As was also explained above, the feedback supply circuit 32 is energized by the A.-C. voltage appearing across the load 30 and, in turn, develops a corresponding D.-C. signal which is fed to output meter 34, rate circuit 36, reset circuit 38, and proportional circuit 39. Circuit 32 includes a transformer 262, the output of which is converted to direct current by a full wave rectifier 264, and the D.-C. signal is applied to a series resistor 266, a shunt resistor 268 and a filter capacitor 270. The filtered D.-C. output is applied to the output meter 34 (see FIGURE 4) and then to the "rate" circuit 36 which consists of a pair of shunt connected resistors 272 and 274, a variable rate resistor 276 and a rate capacitor 278. The output of the rate circuit is fed to the reset circuit 38 which consists of a low leakage series reset capacitor 280 and a variable shunt reset resistor 282 connected in series with a fixed resistor 284. The output of the reset circuit 38 is directed through two isolating resistors 286 and 288 to the proportioning circuit consisting of the variable resistor 290. The capacitor 292 is used to eliminate any vestige of 60 cycle spikes being fed back from the SCR circuitry. The voltage developed across the resistor 290 is fed to the feedback windings 76 and 78 as previously described.

The output of the feedback supply circuit 32 also is applied to the series combination of a resistor 294, a capacitor 296, and input winding 114 of the second stage magnetic amplifier 22. This arrangement serves as an "anti-hunt" network which feeds back a "rate" signal to the second stage amplifier 22 to prevent instability in the control system resulting from time lags in the SCR gating magnetic amplifier 24, and to improve the overall circuit high-frequency response.

As previously explained, it is desirable to provide for visual indication of the magnitude of the error signal produced by the thermocouple 12. The thermocouple signal is normally very minute, e.g., of the order of $10^{-6}$ to $10^{-9}$ amperes, and can be observed directly only on a very sensitive meter. Such a delicate instrument is impractical for industrial applications with the result that it is necessary to provide additional circuitry and a sturdy instrument to indicate the error signal. For this purpose the error signal is conducted from the output of the magnetic amplifier 20, which, as previously explained, is especially designed to have a zero setting which is extremely stable with respect to time, temperature, and line voltage, through two leads 298 and 300 to the three-position switch 18. When the switch 18 is in either the automatic position (as shown) or the manual position, line 298 is connected to contact arm 302 and line 300 to arm 304. Arm 302 leads through line 306 and two-position switch 308 to isolating resistor 310 and inductor 312 which are connected in series with the input winding 314 of the balanced magnetic error meter amplifier 42. The input winding 314 is connected at its opposite end through line 316 to contact arm 304 and line 300. As in the other magnetic amplifiers described above, amplifier 42 includes a pair of magnetic cores 318 and 320 which may have a toroidal configuration.

Bias windings 322 and 324 are wound on cores 318 and 320, respectively, and are energized in series by the regulated power supply 46 through a series current limiting resistor 326. Output windings 328 and 330 are wound on cores 318 and 320, respectively, and are energized in parallel through a corresponding pair of diodes 332 and 334, the common terminals of which are connected to a 6 volt winding 336 of power transformer 338. The remote terminals of output windings 328 and 330 are connected to a balanceable load 340 consisting of a potentiometer 342 connected in series between two resistors 344 and 346 whose remote ends are connected to corresponding remote ends of a pair of series-connected filter capacitors 348 and 350. The wiper arm 352 of potentiometer 342 is connected to the midpoint between the capacitors 348 and 350 and to the transformer secondary winding 336. The total load on the amplifier 42 includes the error meter 40 which is connected across the balanceable load 340.

When there is no error signal present, the two cores 318 and 320 of amplifier 42 are magnetized equally and error meter 40 has a zero reading. This zero setting is adjusted by first removing any input signal from the amplifier 42 and then balancing the load 340 to give a zero error meter reading. The input is removed by operating switch 308 and the load is balanced by adjusting wiper arm 352 of potentiometer 342. When there is an error signal present, the cores 318 and 320 are magnetized unequally and a voltage having a magnitude and polarity determined by the error signal is produced across the balanced load 340 and is indicated by the error meter 40. The error meter amplifier 42 should have properties analogous to amplifier 20 in that its zero should also be vary stable with time, temperature, and line voltage; otherwise, the error meter 40 would give false indications. However, since the input signal of amplifier 42, as seen by control winding 314, is at least 100 times greater than the error signal of amplifier 20, the problem of construction of a stable zero amplifier 42 is simplified considerably. Capacitance pick-up, for instance, can now be completely eliminated by routine shielding, rather than requiring elaborate precautions in symmetry of construction, as in the case of amplifier 20. It then becomes possible to use an inexpensive, stable micro-ammeter for the error meter 40. The sensitivity of the combined amplifiers 20 and 42 and the meter 40 is such that a change of thermocouple signal of 1 micro-volt is easily seen; and the overall stability of zero is plus or minus 2 micro-volts.

As was explained above, when manual operation of the controller 10 is desired, the output of the manual control circuit 44 is substituted for the output of the second stage amplifier 22 as an input to the SCR gating magnetic amplifier 24. The manual control circuit 44 includes a series-connected potentiometer 354 and resistor 356 whose remote ends are connected to the output of the regulated power supply 46. The voltage between the potentiometer wiper 358 and the remote end of resistor 356 is filtered by resistor 360 and capacitor 362 and is conducted from the manual control circuit 44 through line 364 to contact arm 366 of switch 18. Arm 366 is connected to line 368 and thence to the "dummy" load 48 when the switch 18 is in the automatic or the "balance" (intermediate) position. The "dummy" load 48 is designed to have approximately the same resistance as the input to the SCR gating magnetic amplifier 24. It consists of a fixed resistor 370 connected in parallel with a variable adjustment resistor 372.

Contact arm 374 is connected through line 376 to the variable reset resistor 282 (see FIGURE 4) and line 378 so that when the switch 18 is in manual position resistor 282 will be short-circuited. This operating condition assures that the reset condenser is always charged to the proper value required by the load condition during manual operation, hence eliminating a "bump" (transient) when transferring from manual to automatic operation.

With the switch 18 in its automatic position, it is seen that the error signal is amplified by amplifiers 20 and 22 and is fed to the SCR gating magnetic amplifier 24 for controlling the flow of power to the load 30. The error signal magnitude and polarity is indicated by the error meter 40.

When it is desired to switch to manual operation, it is necessary first to turn switch 18 to the "balance" or intermediate position. In this position it is seen that contact arms 152 and 366 remain connected, respectively, to lines 154 and 368 so that the output of the manual control circuit 44 remains connected to the dummy load 46 and the output of amplifier 22 remains connected to the input of the SCR gating magnetic amplifier 24. The only change effected by switching to the balance position is that arms 302 and 304 are moved to contact, respectively, lines 154 and 368. With this arrangement the error meter 40 indicates the difference existing between the outputs of the manual control circuit 44 and the amplifier 22. Adjustment of potentiometer 354 is then made until the error meter 40 gives a zero reading. The switch 18 is then moved to manual position where arm 152 is now connected through lead 368 to the dummy load 48 and arm 366 is connected through lead 154 to the input winding 156 of the SCR gating magnetic amplifier 24, so that the manual control circuit 44 has replaced the amplifier 22. Furthermore, arms 302 and 304 are returned, respectively to contact leads 298 and 300 so that the error meter 40 again indicates the error signal. In addition, arm 374 contacts lead 378 so that reset resistor 282 is short circuited. The operator then corrects temperature variations by adjusting the manual control potentiometer 354.

The regulated power supply 16 includes a full wave rectifier circuit consisting of two diodes 380 and 382 energized in the usual manner by a center-tapped secondary winding 384 on the power transformer 104. The D.-C. output of this rectifier circuit is smoothed by an R-C filter 386 and is maintained constant at a desired level by reverse-connected Zener diodes 388 and 390. The voltage output from the diodes 388 and 390 is reduced by a series resistor 392 and is then regulated at the lower voltage level by reverse-connected Zener diode 394. Resistors 396, 398 and 400 limit the current flow to the setpoint network 14. This two stage cascaded regulator maintains an output voltage stable to less than 0.05%. Correction for a residual error in output voltage as a function of ambient temperature is made by the use of a suitably chosen temperature sensitive resistor 396.

Regulated supply 46 is similar to supply 16 and includes a full wave rectifier having two diodes 402 and 404 supplied by winding 406 of transformer 338. An R-C filter 408 smoothes the rectifier output which is then conducted through series resistor 410 to the voltage regulating reverse-connected Zener diode 412.

Amplifiers 20 and 22; feedback circuitry 36, 38 and 39, and power supply 16 are all mounted on a common shield plate or chassis 414 (see FIGURE 4), and important parts of the circuitry are connected electrically to this plate to constitute the "chassis ground" (see FIGURE 2 for the symbols representing "case ground" and "chassis ground"). The metal enclosure 416 (see FIGURE 1) into which the various components are placed, including the power unit, are connected to an earth or electrical system ground ("case ground") for reasons of safety of operating personnel. These two "grounds" must be kept electrically isolated in order to minimize 60 cycle pick-up which would ordinarily occur due to "ground currents" that would inevitably flow in the case. To further isolate these two grounding systems, every power transformer is provided with two sets of insulated shields between windings. The shields adjacent to the input power are connected to the "case" ground, while the interwinding shields are connected to the "chassis" ground. This arrangement eliminates capacitive coupling from the power circuits to the low level amplifiers, and allows effective detection of the very low level signals.

This controller solved an important problem in the industries where it is now used. Before its advent the controllers used made use of very large and inefficient magnetic amplifiers. These prior controllers were very expensive because of the high cost of their magnetic cores and associated apparatus. Their bulkiness and weight made installation difficult. The present controller, on the other hand, is very compact and efficient, while keeping the advantageous use of magnetic amplifiers to amplify control signals. The controllers are now used in industry and provide temperature control accurate to within five one hundredths of one percent.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Industrial process control apparatus for producing a high-powered electrical output signal for maintaining a variable of the process at a predetermined value, said apparatus comprising, in combination; an input circuit to receive a D.-C. measurement signal corresponding to the value of the process variable; adjustable set-point circuit means connected to said input circuit to develop a D.-C. set-point signal in series-opposition to said measurement signal and to produce a deviation signal in accordance with the difference therebetween; a balanced magnetic amplifier having a pair of magnetic cores, control winding means coupled to said cores and connected to said input and set-point circuit to receive said deviation signal, output winding means for said magnetic amplifier to develop an output signal which varies with changes in said deviation signal; gating signal means energized by an A.-C. power source and said amplifier output signal to produce gating signals each of which is synchronized with said A.-C. power source voltage and is generated during each half-cycle of said voltage at an instant determined by the magnitude of said amplifier output signal; silicon controlled rectifier means including a pair of series-connected silicon control rectifiers each having a control electrode coupled with said gating signal means to receive said gating signals and arranged so that each rectifier conducts during alternate half-cycles of said A.-C. source power; a load circuit connected to said controlled rectifier means to receive the output current thereof; a negative feedback circuit coupled directly across said load circuit to develop a negative feedback signal in accordance with the output of said controlled rectifier means; and means to couple said feedback signal to said magnetic amplifier to oppose the effects of changes in said deviation signal, said feedback circuit including reactive circuit elements to introduce rate and reset action in the output current fed to said load circuit.

2. Industrial process control apparatus for producing a high-powered electrical output signal for maintaining a variable of the process at a predetermined value, said apparatus comprising, in combination; an input circuit to receive a D.-C. measurement signal corresponding to the value of the process variable; adjustable set-point circuit means connected to said input circuit to develop a D.-C. set-point signal in series-opposition to said measurement signal and to produce a deviation signal in accordance with the difference therebetween; a balanced magnetic amplifier having a pair of magnetic cores, control winding means coupled to said cores and connected to said input and set-point circuit to receive said deviation signal, output winding means for said magnetic amplifier to develop an output signal corresponding to said deviation signal; gating signal means energized by an A.-C. power source and said amplifier output signal to produce gating signals each of which is synchronized with said A.-C. power source voltage and is generated during each half-cycle of said voltage at an instant determined by the magnitude of said amplifier output signal; silicon controlled rectifier means including a pair of series-connected silicon controlled rectifiers each having a control electrode, one of said electrodes being coupled with said gating signal generating means to receive gating signals, a capacitive and a resistive element connected to said rectifiers and operable when one of said rectifiers is fired to produce a transient voltage by the discharge of said capacitive element through said resistive element to initiate conduction of the other of said rectifiers a relatively small amount of time after the first of said rectifiers has fired; an A.-C. power circuit for energizing said controlled rectifier means; a load circuit connected to said controlled rectifier means to receive the output current thereof; a negative feedback circuit coupled to said load circuit to develop a negative feedback signal in accordance with the output of said controlled rectifier means; and means to couple said feedback signal to said magnetic amplifier to oppose the effects of changes in said deviation signal.

3. Industrial process control apparatus for automatically regulating the flow of large amounts of electrical energy to a heating element so as to maintain the temperature of the process at a desired value, said apparatus comprising, in combination; a circuit for receiving a D.-C. signal corresponding to the measured temperature; a setpoint circuit connected in series opposition to said receiving circuit to produce a deviation signal in accordance with the difference between the voltage developed by said set-point circuit and said measurement signal; a balanced magnetic amplifier including a pair of control windings, a pair of bias windings, a pair of feedback windings and a pair of output windings, each winding of each of said pairs of windings being coupled with one of said cores and being connected in series with the other winding of said pair, said control windings being connected to said set-point and receiving circuits to receive said deviation signal, means connected to said bias windings for energizing them to a desired level, and a balanced load connected to said output windings for developing an amplified output signal corresponding to said deviation signal; a second magnetic amplifier having a control winding, a bias winding and two feedback windings, all of said windings being coupled with both of said cores, a pair of series-connected output windings each of which is coupled with one of said cores and is connected to an output load, said control winding being connected to said balanced load of said balanced amplifier to receive said amplified deviation signal, said feedback windings being connected to said output load, and means for variably supplying said bias winding so that the output of said second magnetic amplifier can be adjusted to a desired level when no deviation signal is delivered; a gating signal generator including a magnetic core, control winding means coupled to said core and connected to said output load of said second magnetic amplifier, a bias winding coupled to said core and energized by an A.-C. power source and output winding means coupled to said core and also energized by said A.-C. power source so as to provide fail-safe operation of said control pulse generator and for developing an output firing pulse at a time during each cycle of source voltage determined by the current flowing in said control winding; a distribution transformer having a primary winding and two secondary windings, said primary winding being connected to said output winding means to receive said gating signals; a silicon controlled rectifier circuit including two series-connected pairs of silicon controlled rectifiers energized by said A.-C. source and having two corresponding pairs of control electrodes, one control electrode of each pair being coupled with one of said secondary windings of said distribution transformer to receive a gating signal during each alternate half-cycle of source voltage, two sets of resistive and capacitive elements, each set being so connected with one of said pairs of rectifiers that when one of said rectifiers is fired by one of said gating signals a transient voltage is generated by the discharge of one of said capacitive elements through said resistive element and said conducting rectifier and causes conduction of the other rectifier of said pair a small time after the first of said rectifiers has fired, said series-connected silicon controlled rectifiers being energized in series with said A.-C. power source through a load which includes said heating element; a negative feedback circuit connected to said load to develop a negative D.-C. feedback signal in accordance with the output of said controlled rectifier circuit and including means for converting the A.-C. feedback signal to a D.-C. feedback signal; and means to couple said feedback signal to said feedback windings of said balanced magnetic amplifier to oppose the effects of changes in said deviation signal, said feedback circuit including reactive elements to introduce rate and reset action in the output current flowing through said load.

4. Very small signal magnetic amplification apparatus for use in industrial process control systems and the like, comprising, in combination, saturable magnetic core material forming two flux paths; two input windings, each of which is coupled to one of said flux paths to control the level of flux in said paths; an input circuit connected to said input windings and adapted to feed a current signal thereto; a high impedance, very low distributed capacitance inductor connected in series with said input windings, said inductor comprising a plurality of spaced, piled windings wound on a support; two output windings, each of which is coupled to one of flux paths, said output windings being arranged upon the flow of current therethrough to differentially alter the flux in said paths respectively; two feedback windings, each of which is coupled to one of said flux paths and is connected to a feedback circuit for supplying said winding with rate and reset signals to vary the magnetization level in said flux paths with respect to time and thereby vary the current flowing through said output windings with respect to time; an A.-C. supply circuit for energizing said output windings; means in said supply circuit for causing the energizing current to flow through both of said output windings simultaneously and only during one half-cycle of the A.-C. supply voltage; and a balanced load including first and second elements each connected to one of said output windings to be energized by the respective currents flowing therethrough, said elements being connected in series-opposition so as to produce a differential output voltage between the remote terminals thereof in accordance with the relative magnitudes of the respective currents through said output windings.

5. Very small signal magnetic amplification apparatus for use in industrial process control systems and the like, comprising, in combination, saturable magnetic core material forming two flux paths; two input windings, each of which is coupled to one of said flux paths to control the level of flux in said paths; an input circuit connected to said input windings and adapted to feed a current signal thereto; a high impedance, very low distributed capacitance choke connected in series with said input windings, said inductor comprising a pair of bank windings of electrically conductive wire symmetrically positioned on a single support structure; two output windings, each of which is coupled to one of said flux paths, said output windings being arranged upon the flow of current therethrough to differentially alter the flux in said paths respectively; two bias windings, each of which is coupled to one of said flux paths and is energized to a predetermined level by a suitable electrical power source; two feedback windings, each of which is coupled to one of said flux paths and is connected to a feedback circuit for supplying said winding with rate and reset signals to vary the magnetization level in said flux paths with respect to time and thereby vary the current flowing through said output windings with respect to time; an A.-C. supply circuit for energizing said output windings, means in said supply circuit for causing the energizing current to flow through both of said output windings simultaneously and only during one half-cycle of the A.-C. supply voltage; and a balanced load including first and second elements each connected to one of said output windings to be energized by the respective currents flowing therethrough, said elements being connected in series-opposition so as to produce a differential output voltage between the remote terminals thereof in accordance with the relative magnitudes of the respective currents through said output windings.

6. Industrial process control apparatus for producing a high-powered electrical output signal comprising an input circuit to receive a measurement signal, a power output unit including controlled rectifier means, an A.-C. power circuit for supplying current to said controlled rectifier means, a firing circuit unit for producing gating signals for said controlled rectifier means, said firing circuit unit including an amplifier responsive to said measurement signal, said amplifier having bias means and being adapted to produce said gating signals when no bias signals is supplied to said bias means, said bias means being adapted to prevent the production of said gating signals by said amplifier when said bias means is energized and no measurement signal is received, and fail-safe circuit means for energizing said bias means directly from said A.-C. power circuit to assure that said bias means is energized whenever A.-C. power is applied to said controlled rectifier means.

7. Industrial process control apparatus for producing a high-powered electrical output signal comprising an input circuit to receive a measurement signal, a power output unit including controlled rectifier means, an A.-C. power circuit for supplying current to said controlled rectifier means, a firing circuit unit for producing firing pulses for said controlled rectifier means, said firing circuit including a magnetic amplifier responsive to said measurement signal and including a magnetic core, control winding means coupled to said core and connected to said input circuit, bias winding means coupled to said core for producing magnetization of said core to a predetermined level, output winding means coupled to said core for producing gating signals in response to said measurement signal, said bias means being adapted to produce magnetization in said core in a direction such as to prevent the production of said gating signals when no measurement signal is received, and fail-safe circuit means for energizing said bias winding means and said output winding means directly from said A.-C. power circuit to assure that both said bias means and said output winding means are energize whenever A.-C. power is applied to said controlled rectifier means.

8. Industrial process control apparatus for producing a high-powered electrical output signal comprising an input circuit to receive a measurement signal, a power output unit including silicon controlled rectifier means, an A.-C. power circuit for supplying current to said silicon controlled rectifier means, a firing circuit unit for producing firing signals for said silicon controlled rectifier means, said firing circuit including a magnetic amplifier responsive to said measurement signal and including a magnetic core, control winding means coupled to said core and connected to said input circuit, bias winding means coupled to said core for producing magnetization of said core to a predetermined level and in a direction opposite to the magnetization produced by said control winding means, said predetermined level being of a magnitude such that said core will not become magnetically saturated when said bias winding means is energized and no measurement signal is received, output winding means coupled to said core for producing firing pulses in response to said measurement signal, and fail-safe circuit means for energizing said bias winding means and said output winding means directly from said A.-C. power circuit to assure that both said bias winding means and said output winding means are energized whenever A.-C. power is applied to said silicon controlled rectifier means, said fail-safe circuit means including a power transformer having a primary winding energized by said A.-C. power circuit, a first secondary winding connected to said bias winding means and a second secondary winding connected to said output winding means.

9. Process control apparatus of the type described for utilizing very low level control signals to control high power electrical power flow, said apparatus comprising, in combination; control signal comparison and amplifying means, said amplifying means including at least one magnetic amplifier for amplifying very small control signals, and time-varying feedback means for said magnetic amplifier; control rectifier means; electrically conductive support means comprising a common electrical ground connection for said comparison and amplifying means and said control rectifier means; electrically conductive enclosure means for containing said apparatus, said enclosure means comprising a safety ground for said apparatus for protecting operating personnel, said safety ground being conductively isolated from said comparison and amplifying means ground to prevent the imposition of errors into said apparatus by ambient or other stray electrical signals.

10. Apparatus as in claim 9 wherein said controlled rectifier means is a silicon controlled rectifier circuit, and in which said control signal comparison and amplifying means also includes a gating magnetic amplifier for supplying gating signals to said silicon controlled rectifier circuit, and a plurality of transformers each having insulating shields between its windings, some of said shields being positioned adjacent the primary windings of said transformers and being electrically connected to said enclosure means, and others of said shields being positioned adjacent the secondary windings of said transformers and being electrically connected to said support means.

11. Industrial process control apparatus for automatically regulating the flow of large amounts of electrical energy so as to maintain a variable of the process at a desired value, said apparatus comprising, in combination; means for receiving a D.-C. signal developed in response to deviation of said process variable from said desired value; a balanced magnetic amplifier including saturable magnetic core material forming two flux paths; two input windings, each of which is coupled to one of said flux paths to control the level of flux in said paths; an input circuit connected to said input windings and adapted to feed a current signal thereto; a high impedance, very low distributed capacitance inductor connected in series with said input windings, said inductor comprising a plurality of spaced, piled windings wound on a support; two output windings, each of which is coupled to one of flux paths, said output windings being arranged upon the flow of current therethrough to differentially alter the flux in said paths respectively; two feedback windings, each of which is coupled to one of said flux paths and is connected to a feedback circuit for supplying said winding with rate and reset signals to vary the magnetization level in said flux paths with respect to time and thereby vary the current flowing through said output windings with respect to time; and A.-C. supply circuit for energizing said output windings; means in said supply circuit for causing the energizing current to flow through both of said output windings simultaneously and only during one half-cycle of the A.-C. supply voltage; and a balanced load including first and second elements each connected to one of said output windings to be energized by the respective currents flowing therethrough, said elements being connected in series-opposition so as to produce a differential output voltage between the remote terminals thereof in accordance with the relative magnitudes of the respective currents through said output windings, said input windings being connected to said receiving means, and said balanced load developing an amplified signal corresponding to said deviation signal; means connected to said balanced load for generating electrical gating signals spaced in time from one another in correspondence to said output voltage of said magnetic amplifier; electrical circuit control means having control electrode means connected to said gating signal generating means for receiving said gating signals; a load and an alternating-current electrical power source connected together and to said electrical circuit control means; and feedback means connected between said load and the input of said balanced magnetic amplifier for producing rate and reset action in the current flowing through said load, said gating signals controlling the conduction of power from said source to said load through said electrical circuit control means to maintain said process variable at said desired value.

12. Industrial process control apparatus for producing a high-powered electrical output signal for maintaining a variable of the process at a predetermined value, said apparatus comprising, in combination; an input circuit to receive a D.-C. measurement signal corresponding to the value of the process variable; adjustable set-point circuit means connected to said input circuit to develop a D.-C. set-point signal in series-opposition to said measurement signal and to produce a deviation signal in accordance with the difference therebetween; a balanced magnetic amplifier including saturable magnetic core material forming two flux paths; two input windings, each of which is coupled to one of said flux paths to control the level of flux in said paths; an input circuit connected to said input windings and said set point circuit means and adapted to feed said deviation signal to said input windings; a high impedance, very low distributed capacitance choke connected in series with said input windings, said inductor comprising a pair of bank windings of electrically conductive wire symmetrically positioned on a single support structure; two output windings, each of which is coupled to one of said flux paths, said output windings being arranged upon the flow of current therethrough to differentially alter the flux in said paths respectively; two bias windings, each of which is coupled to one of said flux paths and is energized to a predetermined level by a suitable electrical power source; two feedback windings, each of which is coupled to one of said flux paths and is connected to a feedback circuit for supplying said winding with rate and reset signals to vary the magnetization level in said flux paths with respect to time and thereby vary the current flowing through said output windings with respect to time; an A.-C. supply circuit for energizing said output windings, means in said supply circuit for causing the energizing current to flow through both of said output windings simultaneously and only during one half-cycle of the A.-C. supply voltage; and a balanced load including first and second elements each connected to one of said output windings to be energized by the respective currents flowing therethrough, said elements being connected in series-opoposition so as to produce a differential output voltage between the remote terminals thereof in accordance with the relative magnitudes of the respective currents through said output windings, said output windings being adapted to develop an output signal which varies with changes in said deviation signal; gating signal means energized by an A.-C. power source and said amplifier output signal to produce gating signals each of which is synchronized with said A.-C. power source voltage and is generated during each half-cycle of said voltage at an instant determined by the magnitude of said amplifier output signal; silicon controlled rectifier means including a pair of series-connected silicon control rectifiers each having a control electrode coupled with said gating signal means to receive said gating signals and arranged so that each rectifier conducts during alternate half-cycles of said A.-C. source power; a load circuit connected to said controlled rectifier means to receive the output current thereof; a negative feedback circuit coupled directly across said load circuit to develop a negative feedback signal in accordance with the output of said controlled rectifier means; and means to couple said feedback signal to said magnetic amplifier to oppose the effects of changes in said deviation signal, said feedback circuit including reactive circuit elements to introduce rate and reset action in the output current fed to said load circuit.

13. Industrial process control apparatus for regulating the flow of large amounts of electrical energy so as to maintain a variable of the process at a desired value, said apparatus comprising, in combination, means for developing a measurement signal corresponding to the value of the process variable; set signal means; comparison circuit means responsive to said measurement and set signal to produce a deviation signal corresponding to the difference between said process variable and said desired value; at least one balanced magnetic amplifier adapted to produce no output signal when it receives no input signal and to become unbalanced and produce an output signal in response to its receipt of an input signal, said balanced magnetic amplifier being connected to the output of said comparison circuit means for amplifying said deviation signal; control signal generating means responsive to the output of said balanced magnetic amplifier; controlled rectifier means; a load and an alternating-current electrical power source connected together and to said controlled rectifier means, said control signal generating means being operable to gate said controlled rectifier means on for a portion of the alternating-current cycle corresponding to the magnitude of the output of said balanced magnetic amplifier; and feedback means connected between said load and the input of said balanced magnetic amplifier, said feedback means including rectifier means for producing a D.-C. feedback signal, said feedback circuit further including reactive means for altering said D.-C. feedback signal to introduce time-varying action in the output current flowing through said load, the conduction of said controlled rectifier means being automatically regulated by said control signal generating means in response to said deviation signal and said feedback signal, to maintain said process variable stably at said desired value.

14. Apparatus as in claim 13 including manually operable means for regulating said control signal generating means; and switching means for disconnecting said balanced magnetic amplifier from said control signal generating means and connecting said manually operable means to said signal generating means to provide for either automatic or manual control of said process.

15. Apparatus as in claim 13 including manually operable means for regulating said control signal generating means and switching means for disconnecting said balanced magnetic amplifier from said control signal generating means and connecting said manually operable means thereto to provide for either manual or automatic control of said process variable, said switching means including apparatus operable for equating the electrical output of said manually operable means and the output of said balanced magnetic amplifier before switching from automatic to manual control.

16. Apparatus as in claim 13 including meter means; a balanced magnetic meter signal amplifier connected to said meter means for amplifying electrical signals to be indicated by said meter means; and means for connecting the input terminals of said balanced magnetic meter signal amplifier to the output terminals of said balanced magnetic deviation signal amplifier so that said meter means receives a signal amplified by said balanced magnetic amplifiers and proportional to said deviation signal.

17. Industrial process control apparatus for regulating the flow of large amounts of electrical energy so as to maintain a variable of the process at a desired value, said apparatus comprising, in combination, means for developing a measurement signal corresponding to the value of the process variable; adjustable set signal means; comparison circuit means responsive to said measurement and set signal to produce a deviation signal corresponding to the difference between said process variable and said desired value; means connected to the output of said comparison circuit means for amplifying said deviation signal; control signal generating means responsive to the output of said amplifying means; controlled rectifier means; a load and a high-voltage alternating-current electrical power source connected together and to said controlled rectifier means, said control signal generating means being operable to gate said controlled rectifier means on for a portion of the alternating-currrent cycle corresponding to the magnitude of the output of said amplifying means; feedback means connected between said load and the input of said amplifying means, said feedback means including rectifier means for producing a D.-C. feedback signal, said feedback circuit further including reactive means for altering said D.-C. feedback signal to introduce time-varying action in the output currrent flowing through said load to compensate for time lags in the system, the conduction of said controlled rectifier means being automatically regulated by said control signal generating means in response to said deviation signal and said feedback signal, to maintain said process variable stably at said desired value; manually operable means for regulating said control signal generating means; and three-position switching means operable to one position wherein said meter means and said control signal generator are connected to said amplifying means to provide for automatic operation of said controller, a second position wherein said meter means is connected to said amplifying and said manually operable means for equating their outputs before switching from automatic to manual operation, and a third position wherein said manually operable means is connected in place of said amplifying means to said control signal generator and said meter means is reconnected to said amplifying means so that said process variable may be controlled manually.

18. Industrial process control apparatus for regulating the flow of large amounts of electrical energy so as to maintain a variable of the process at a desired value, said apparatus comprising, in combination, means for developing a measurement signal corresponding to the value of the process variable; adjustable set signal means; comparison circuit means responsive to said measurement and set signal to produce a deviation signal corresponding to the difference between said process variable and said desired value; means connected to the output of said comparison circuit means for amplifying said deviation signal; control signal generating means responsive to the output of said amplifying means; controlled rectifier means; a load and a high-voltage alternating-current electrical power source connected together and to said controlled rectifier means, said control signal generating means being operable to gate said controlled rectifier means on for a portion of the alternating-current cycle corresponding to the magnitude of the output of said amplifying means; feedback means connected between said load and the input of said amplifying means, said feedback means including rectifier means for producing a D.-C. feedback signal, said feedback circuit further including reactive means for altering said D.-C. feedback signal to introduce time-varying action in the output current flowing through said load to compensate for time lags in the system, the conduction of said controlled rectifier means being automatically regulated by said control signal generating means in response to said deviation signal and said feedback signal to maintain said process variable stably at said desired value; meter means; manually operable means for regulating said control signal generating means; switching means for connecting said manually operable means in place of said amplifying means to provide for either automatic or manual control of said process parameter; a magnetic amplifier connected to said meter means for amplifying signals to be indicated by said meter, said amplifier including a pair of saturable cores, control winding means coupled to said cores and connected to said switching means, output winding means coupled with said cores and connected to said meter means, said switching means being operable to connect said control winding means to said deviation signal amplifying means to provide indication of said deviation signal during either automatic or manual operation, and to connect said control winding means to said deviation signal amplifying means and said manually operable means to provide for equalization of their outputs before switching from automatic to manual operation.

19. Industrial process apparatus for automatically regulating the flow of large amounts of electrical energy so as to maintain a variable of a process at a desired value, said apparatus comprising, in combination; an input circuit to receive an electrical measurement signal corresponding to the value of the process variable; means for producing a deviation signal in accordance with the difference between said measurement signal and an electrical reference signal; a balanced magnetic amplifier having a pair of magnetic cores; control winding means coupled to said cores and connected to said input circuit to receive said deviation signal; output winding means for said magnetic amplifier for developing an output signal which varies with changes in said deviation signal; gating signal means connected to said output winding means for generating electrical gating signals, an A.-C. power source, said gating signals being synchronized with the voltage signal of said A.-C. power source and being generated at an instant determined by the magnitude of said balanced magnetic amplifier output signal; silicon controlled rectifier means including at least one silicon controlled rectifier having a control electrode adapted to receive gating signals from said gating signal means; a load circuit connected to said silicon controlled rectifier to receive the output current therof; means connecting said silicon controlled rectifier to said load circuit and said A.-C. power source so that said controlled rectifier regulates the electrical energy delivered to said load circuit by said power source; a negative feedback circuit connected to said load circuit to develop a direct current negative feedback signal in accordance with the output of said silicon controlled rectifier means; and means to couple said feedback signal to said magnetic amplifier to oppose the effects of changes in said deviation signal, said feedback circuit including reactive circuit elements for introducing time-varying action in the output current fed to said load circuit.

20. An industrial process controller for regulating the flow of large amounts of electrical energy so as to maintain a variable of a process at a desired value, said controller including, in combination; means for receiving an electrical signal responsive to deviations of said process variable from said desired value; means for amplifying said deviation signal; a load circuit; an A.-C. power supply connected to said load circuit; silicon controlled rectifier means including at least one silicon controlled rectifier connected to said load circuit and said power supply to regulate the electrical energy delivered from said power supply to said load circuit; and gating circuit means for receiving the output signal from said amplifying means and supplying gating signals to said silicon controlled rectifier means, said gating signals being synchronized with the voltage signal of said A.-C. power supply and being initiated at instants of time determined by the magnitude of the amplified deviation signal received by said gating circuit means from said amplifying means, said gating circuit means including means for generating each of said gating signals substantially continuously for the full time interval from the instant said signal first is applied during a half-cycle of A.-C. power supply voltage until said half-cycle is ended, thereby tending to hold said silicon controlled rectifier in a conducting state for said full time interval.

21. Apparatus as in claim 20 in which each of said gating signals has an essentially rectangular wave shape.

22. Apparatus as in claim 21 in which said gating circuit means includes a magnetic amplifier having an output winding whose conduction is controlled by said amplified deviation signal and which is energized from said A.-C. power supply through a voltage limiter circuit comprising a pair of reverse-connected Zener diodes connected between a pair of conductors connected from said A.-C. supply to said output winding, and a gating signal load element connected in series with said output winding for supplying said gating signals to said controlled rectifier means.

References Cited by the Examiner
UNITED STATES PATENTS

| | | | |
|---|---|---|---|
| 2,805,311 | 9/57 | Fluegel et al. | 219—499 |
| 2,806,197 | 9/57 | Rockafellow | 323—22 |
| 2,825,006 | 2/58 | Leppla | 317—18 |
| 2,895,085 | 7/59 | Sieband | 323—89 X |
| 2,944,137 | 7/60 | Kaltenbach | 219—497 |

(Other references on following page)

UNITED STATES PATENTS

| | | | |
|---|---|---|---|
| 3,005,933 | 10/61 | Christ | 219—499 X |
| 3,014,185 | 12/61 | Montner | 330—8 |
| 3,015,039 | 12/61 | Morgan | 323—89 X |
| 3,016,493 | 1/62 | Darling | 330—8 |
| 3,036,188 | 5/62 | Ditto | 219—492 |
| 3,049,659 | 8/62 | Armour | 323—22 |
| 3,050,611 | 8/62 | Kamide | 219—505 X |
| 3,058,035 | 10/62 | Brown | 317—18 |
| 3,076,924 | 2/63 | Manteuffel | 323—89 |
| 3,129,381 | 4/64 | Manteuffel | 323—89 |

RICHARD M. WOOD, *Primary Examiner.*